(12) United States Patent
Vokinger et al.

(10) Patent No.: US 8,085,394 B2
(45) Date of Patent: Dec. 27, 2011

(54) OPTOELECTRONIC LONGITUDINAL MEASUREMENT METHOD AND OPTOELECTRONIC LONGITUDINAL MEASUREMENT DEVICE

(75) Inventors: Urs Vokinger, Au (CH); Heinz Bernhard, Berneck (CH); Werner Amann, Feldkirch (AT)

(73) Assignee: Leica Geosystems AG, Heerburg (CH)

( * ) Notice: Subject to any disclaimer, the term of this patent is extended or adjusted under 35 U.S.C. 154(b) by 190 days.

(21) Appl. No.: 12/600,512

(22) PCT Filed: May 21, 2008

(86) PCT No.: PCT/EP2008/004078
§ 371 (c)(1),
(2), (4) Date: Nov. 17, 2009

(87) PCT Pub. No.: WO2008/141817
PCT Pub. Date: Nov. 27, 2008

(65) Prior Publication Data
US 2010/0134790 A1 Jun. 3, 2010

(30) Foreign Application Priority Data
May 24, 2007 (EP) .................................. 07108837

(51) Int. Cl.
*G01B 11/26* (2006.01)
(52) U.S. Cl. ............. 356/139.03; 356/139.01; 356/139.1
(58) Field of Classification Search ........ 356/3.01–28.5, 356/139.01–139.1
See application file for complete search history.

(56) References Cited

U.S. PATENT DOCUMENTS

| | | | |
|---|---|---|---|
| 3,983,391 A | 9/1976 | Clemons | |
| 4,668,862 A | 5/1987 | Waibel | |
| 5,317,149 A * | 5/1994 | Uebbing et al. | 250/231.14 |
| 6,327,791 B1 | 12/2001 | Norcross et al. | |
| 6,984,837 B2 * | 1/2006 | Gachter et al. | 250/553 |
| 7,145,127 B2 | 12/2006 | Chin et al. | |

FOREIGN PATENT DOCUMENTS

| | | |
|---|---|---|
| CH | 658 514 A5 | 11/1986 |
| DE | 19621188 A1 | 11/1997 |
| EP | 0 643 286 A1 | 9/1993 |
| EP | 0 597 705 A1 | 5/1994 |
| EP | 1111347 A1 | 6/2001 |
| WO | 99/54683 | 10/1999 |

* cited by examiner

*Primary Examiner* — Thomas Tarcza
*Assistant Examiner* — Luke Ratcliffe
(74) *Attorney, Agent, or Firm* — Maschoff Gilmore & Israelsen

(57) ABSTRACT

The invention relates to an optoelectronic measurement method for determining a position, particularly an angle or a length, of a code carrier (10) that carries a position code (11) and is movable relative to a detector element (30) with a degree of freedom, particularly in a rotary or translational fashion. The detector element (30) has at least one line in the longitudinal direction comprising a plurality of light-sensitive receiving regions (31) disposed in a linear fashion. In the course of the positional measurement method, a projection is produced of part of the position code (11) on the detector element (30) that is dependent on the position of the code carrier (10); said projection is produced by at least an emission of optical radiation onto the code carrier (10) using a laser diode (20) having an emitter edge (21), and said projection is detected by the detector element (30). The position of the code carrier (10) relative to the detector element (30) is derived from the projection. According to the invention, in the projection on the detector element (30) thus produced, the axis of divergence of the laser diode emission (26) running perpendicular to the emitter edge (21) has a substantially parallel orientation to the longitudinal axis (34) of the detector element (30).

21 Claims, 5 Drawing Sheets

US 8,085,394 B2

OPTOELECTRONIC LONGITUDINAL MEASUREMENT METHOD AND OPTOELECTRONIC LONGITUDINAL MEASUREMENT DEVICE

The invention relates to an optoelectronic attitude measurement method and an optoelectronic attitude measurement device.

BACKGROUND

The determination of directions, angles and lengths as attitudes is required in many fields of use, such as, for example, in geodetic and industrial surveying. Developments in angle measuring technology led through mechanical reading processes to fully automated angle measurement according to the prior art to date.

Known automated attitude measurement apparatuses generally comprise a code carrier and a scanning device. In angle measurement devices, the code carrier is usually formed so as to be rotatable about an axis relative to the scanning device, an angular position of the code carrier then representing the magnitude to be measured. The code carrier may have, for example, a graduation or coding for position determination, it being possible for the coding to be applied to a surface or lateral surface of the code carrier.

For automatic detection of the attitude, the code carrier moveable relative to the scanning device is scanned by means of different techniques. Known scanning methods are electronic-magnetic, electronic and optoelectronic methods. The following statements relate to optoelectronic scanning methods and scanning devices which have in particular an illumination device and a detector.

For determining, for example, angular positions from 0° to 360°, the coding is usually arranged in a full circle. The angular resolution of the full circle is determined by the type of coding and by the scanning device used for reading the coding. Thus, the angular resolution is increased, for example, by applying a code in a plurality of tracks or by a finer graduation, the achievable resolution being limited for manufacturing and cost reasons. For example, arrangements of one or more detectors are known for reading of the code. CCD line arrays or CCD area arrays may represent, for example, such detectors.

Swiss patent CH 658514 A5 discloses such an apparatus for measuring an angular position. There, a mark whose position relative to a surface of sensors represents the quantity to be measured is focused onto this surface. The output signals of the sensors are passed into an evaluation circuit which sequentially determines the distribution of the intensity of the signals generated by the sensors. The position of the mark in relation to the surface of sensors can be derived from the intensity distribution.

The dimensions of an attitude measurement device for geodetic devices are advantageously to be kept small. To permit a correspondingly compact design which is not very complicated, the illumination device and the detector of the attitude measurement device have for some time been arranged on a common circuit board having an electrical supply, and not as in the past above and below a code carrier, in each case on a separate circuit board having an electrical supply. In the case of attitude measurement devices of the prior art having a side-by-side arrangement of the detector and of the illumination device, the emitted beams are deflected, for example, by a deflection element having two planar, reflective surfaces, so that an image of the code is produced on the detector by the code carrier arranged downstream in the beam path. Optionally, the emitted beams can be collimated by means of an optical system arranged directly downstream of the illumination source.

For example, U.S. Pat. No. 7,145,127 P2 describes a deflection element for an attitude measurement device, where the deflection element has two surfaces oriented towards one another and intended for double reflection of the emitted beams and carries a code focusable onto a sensor and is thus additionally formed as a code carrier.

For achieving as homogeneous an illumination of the code carrier as possible and for producing as uniform a code projection as possible on the detector, laser diodes are now increasingly being used as radiation sources for producing the code projection. For example, EP 0643286 discloses an optoelectronic angle measurement device comprising a semiconductor laser diode as a radiation source. To date, the diodes have been arranged in such a way that the emitter edge of the laser diodes is aligned parallel to the sensor array detecting the code projection. Since the emitted radiation has a higher divergence in the direction transverse to the emission edge than in the direction parallel to the emission edge, downstream arrangement of a beam shaping optical system for collimation of the radiation in a plane perpendicular to the emitter edge is known.

The achievable accuracy of such an attitude measurement depends on a plurality of factors, such as, for example, on the contrast of the code shadow projection produced on the sensor array.

Furthermore, in the case of a code carrier moved relative to the detector, the shadow projection of the code onto the detector may be correspondingly blurred, depending on the exposure time. In order to achieve approximately an accuracy of the relative attitude of the code carrier to the detector of 0.05 μm or, in the determination of a rotational position of the code carrier, of 0.25 arc second, the exposure time must not exceed a duration of about 200 ns. In the case of measuring devices of the prior art, however, the quality of the code projection produced on the detector would generally not be sufficient in an exposure time of only 200 ns to reliably read the position code.

SUMMARY

An object of the invention is therefore the provision of an attitude measurement method and of an attitude measurement device which permit a higher accuracy of measurement.

A use of generic laser diodes which can be produced in a manner which is not very complicated is strived for here.

A further object is a reduction of undesired intensity variations of the optical beams on illumination of the code carrier and the production of the code projection on the detection element.

These objects are achieved by realizing the characterizing features of the independent claims. Features which further develop the invention in an alternative or advantageous manner are described in the dependent patent claims.

In an attitude measurement method according to the invention, a laser diode emits optical radiation by means of its emitter edge to a code carrier which can be moved relative to a detection element in one degree of freedom and carries an optically detectable position code. The laser diode, the moveable position code and the detection element are arranged so that an optically detectable image of a part of the position code, which part is dependent on the position of the code carrier relative to the illumination source, is produced on the detection element. The detection element has, in the longitudinal direction, at least one line with a multiplicity of linearly arranged photosensitive reception regions. Depending on the radiation received within the individual detection regions, signals comprising radiation reception information are produced, it being possible optionally to use a zero signal as information for reception of no radiation. On the basis of an evaluation of the signals, the code is read and an attitude of the code carrier relative to the detection element is derived.

In contrast to the arrangement of the laser diode, known according to the prior art, parallel to the sensor line or to the longitudinal axis of the detection element, according to the invention the laser diode is arranged and oriented relative to the detection element in such a way that the emitter edge of the laser diode is substantially transverse to the longitudinal axis of the sensor array. Since the radiation angle transverse to the emitter edge is greater and the emission along the divergence axis transverse to the emitter edge—namely the fast axis—is more homogeneous than along the emitter edge, more homogeneous illumination of the code can be achieved thereby.

On the other hand, the emitted radiation in the slow axis direction, i.e. in the direction of the divergence axis parallel to the emitter edge, has an undesired nonuniform intensity curve which adversely affects the quality of the code projection in the case of a parallel arrangement of a laser diode in sensor array. In the case of the arrangement according to the invention, substantially a part of the laser diode emission which overlaps in a plane perpendicular to the emitter edge is now used for producing the code projection.

According to the invention, the more homogeneous illumination of the code is achieved by such an arrangement of the laser diode relative to the code carrier, in which the fast axis of the laser diode emission is oriented parallel to the direction of extension of the position code—in the case of an arrangement of the position code, for example, in the circumferential direction on a circular disc, the illumination being effected by the laser diode with the fast axis parallel to the tangential direction of that part of the position code which is to be focused. According to the invention, the laser diode is therefore oriented relative to the sensor line so that the fast axis— i.e. the divergence axis perpendicular to the emitter edge—of the laser diode emission is oriented substantially parallel to the longitudinal axis of the detection element in the case of the projection produced thereby on the detection element. This makes it possible to achieve a more homogeneous illumination of the code and to reduce or even completely prevent the adverse effect of the nonuniform intensity curve of the laser diode emission along the emitter edge, i.e. in the slow axis direction.

Furthermore, by arranging the laser diode, according to the invention, substantially transversely relative to the sensor array, the laser diode serving as a radiation source may be considered approximately as a point light source, with the result that a higher contrast in the image is achievable.

Although a smaller part of the emitted radiation is used for producing the code projection according to the invention—compared with the parallel arrangement of laser diode and sensor array which is usual according to the prior art—a considerably higher contrast in the code image and—owing to the comparatively homogeneous radiation characteristic in an axis transverse to the emission edge—a very homogeneous illumination of the code can be achieved. Increased accuracies of measurement compared with the accuracies achieved in the case of angle measurement devices of the prior art—can be permitted thereby.

Substantially perpendicularly oriented arrangement of the laser diode relative to the sensor array is to be understood as meaning in particular a strict perpendicular orientation, but the advantageous effect can be achieved according to the invention in particular also in the case of an orientation differing by about up to 5° from the strict perpendicular arrangement, in particular in the case of an orientation differing by up to about 10°.

In addition, at least a part of the emitted radiation can be focused in a defined manner onto the receiving regions by means of a focusing element. This increases the intensity of the radiation incident on the detection element. In particular, the radiation is focused in a first plane which is oriented perpendicular to the longitudinal axis of the sensor array. In a second plane perpendicular in particular to the first plane, the radiation can—depending on the need to produce a suitable beam path—be either collimated, expanded, also focused or even not reshaped. For example, it is possible to use for this purpose cylindrical lenses, aspherical optical elements or Fresnel optical systems, which are arranged in the beam path before or after the code carrier and, for example, focus the optical radiation in a targeted manner onto the receiving regions.

Preferably, the code carrier is moveable rotationally or along an axis relative to the detection element. An angle and a length are then determined as a relative attitude of the code carrier.

The laser diode and the sensor array can be arranged opposite one another, in each case on a separate circuit board or side by side on a common circuit board. In both cases, the arrangement according to the invention is effected, with the perpendicular orientation of the emitter edge relative to the sensor array.

In an embodiment comprising an arrangement of the laser diode and of the sensor on a common circuit board, the laser diode—with the fast axis parallel to the direction of extension of that part of the position code which is to be focused—emits optical radiation onto the code carrier, with the result that a homogeneous image of the position code is produced. By means of a deflection element arranged in the beam path after the code carrier—such as, for example, a mirror surface—the focusing of the code can then be deflected onto the detection element. Also possible is an arrangement of the code carrier in the beam path after the deflection element.

In principle, position code is understood as meaning any means by which an optical image of a code can be produced as a function of the rotational position of the code carrier relative to the detection element. A simple design of a code carrier is a partly transparent element having transmittive and absorbing or diffusely scattering regions which represent marks of the code. Diffractive and non diffractive regions are also possible as marks. If radiation is emitted to a partial surface of such a code carrier, an optically readable shadow projection comprising coded attitude information forms. By reading the code, an attitude of the code carrier relative to the radiation source and/or to the detector can be derived. As an alternative to the transmitted-light principle, the formation of the code element according to the reflected-light principle is also possible, in which case the code projection can be produced, for example, by reflective and absorbing regions which represent the code.

It is possible to use both absolute coding and relative, i.e. incremental, coding. However, in the case of relative codings, there is the disadvantage of having to reinitialize the angle-measuring instrument after a power failure.

In an embodiment of the attitude measurement device as an angle-measuring instrument, the code carrier is formed in particular around an axis as a rotating body, for example as a flat cylinder or ring. For the measurement of limited angular ranges, it may be sufficient to form the code carrier as a cylinder or ring element. In an embodiment as a length-measuring instrument, the code carrier has on the other hand in particular an elongated and flat cuboid or rod-like form. It may be produced from glass, plastic or other optically transparent material and also from nontransparent material having slots and/or holes, or may be formed as a diffractive optical element. If an image of the code is produced in reflection, the position code can be formed, for example, by reflective and absorbing regions as marks.

Depending on the chosen embodiment, the position code is composed of a plurality of marks which are a distance apart in the circumferential or axial direction and form a code track, it also being possible for the position code to have a plurality of such tracks, which are then arranged radially or parallel a distance apart.

Suitable detection elements are in particular sensor arrays, it being possible to use in particular—as is known from the prior art—for example photodiodes, CCD sensors or CMOS sensors arranged in a line and also area arrays.

The arrangement of code carrier and scanning device, scanning device being understood as meaning the laser diode—optionally with downstream beam reshaping optical system—together with the detection element, is such that a relative movement in one degree of freedom, in particular a relative rotational movement or relative longitudinal movement along an axis, between code carrier and scanning device is permitted. A rotational movement takes place about an axis of rotation of the code carrier and/or of the scanning device. For example, the code carrier is arranged so as to be rotatable about an axis and corotates with an element whose angular position is to be detected, while the scanning device is fixed in position. Corotation of the scanning device with the element whose angular position is to be detected, while the code carrier remains fixed, would also be possible.

A field of use for attitude measurement devices according to the invention comprises geodetic measuring instruments having the function of direction and angle determination. Thus, for example, theodolites are equipped with horizontal and vertical pitch circle and corresponding reading devices in order to be able to measure horizontal and vertical angles with very high accuracy. Attitude measurement devices are also used in measuring machines of all kinds, such as, for example, coordinate measuring machines having articulated arms.

BRIEF DESCRIPTION OF THE DRAWINGS

The attitude measurement device according to the invention is described in more detail below, purely by way of example, with reference to working examples shown schematically in the drawings. Specifically.

DETAILED DESCRIPTION

Figure 1:
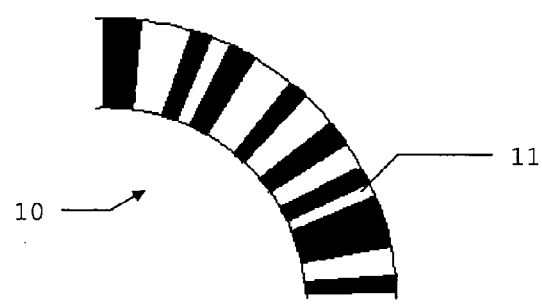
FIG. 1 shows an annular disc as a code carrier having an optically detectable position code according to the prior art.

FIG. 1 shows a code carrier 10 comprising an optically detectable position code 11 according to the prior art for determining a rotational position. The code carrier 10 is in the form of an annular segment and is formed, for example, from plastic and has a concentrically arranged code track as position code 11. The white regions of the position code 11 are formed so as to be transparent to light and the black regions are formed so as to be opaque to light. By illuminating a position-dependent part of the code carrier 10, a shadow projection with coded information about the illuminated part of the code carrier 10, and hence with information about a rotational position of the code carrier 10 relative to an illuminating radiation source, which is shown in the following figures, can be produced.

Figure 2:
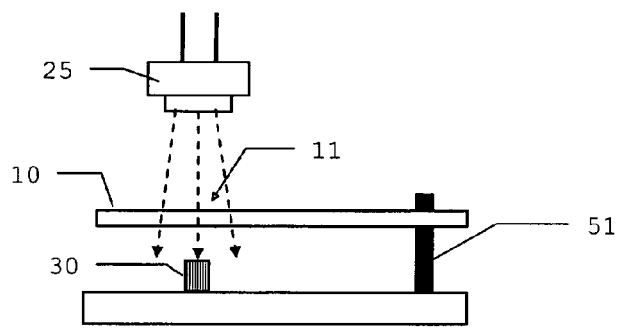
FIG. 2 shows an attitude measurement device of the prior art, a code carrier being arranged between illumination source with collimation optical system and detector.

FIG. 2 shows an attitude measurement device for angle determination of the prior art, comprising an LED 25 as a radiation source, which emits radiation to a code carrier 10. The emitted radiation is represented by the dashed lines. The code carrier 10 has a code dependent on its rotational position, as position code 11, and is rotationally moveable about a rod as axis of rotation 51. As shown in FIG. 1, the code carrier 10 may have transparent and opaque regions as position code 11. As a result, the code is focused by means of—optionally collimated or optimally reshaped—beams onto a detection element 30 arranged opposite the radiation source 20. Since relatively long exposure times are used, the quality of the focusing of the code—i.e. for example the contrast of the beams incident on the detection element 30—is sufficient for reading the position code 11 and deriving a rotational position of the code carrier 10 relative to the fixed detection element 30 therefrom. Owing to the relatively inhomogeneous illumination of the code 11, however, the rotational position can be determined only with an accuracy which has a corresponding upper limit and with a limited reading speed. The required long exposure times also impose an upper limit on the rotational speed of the code carrier 10—for avoiding incorrect measurements.

Figure 3:
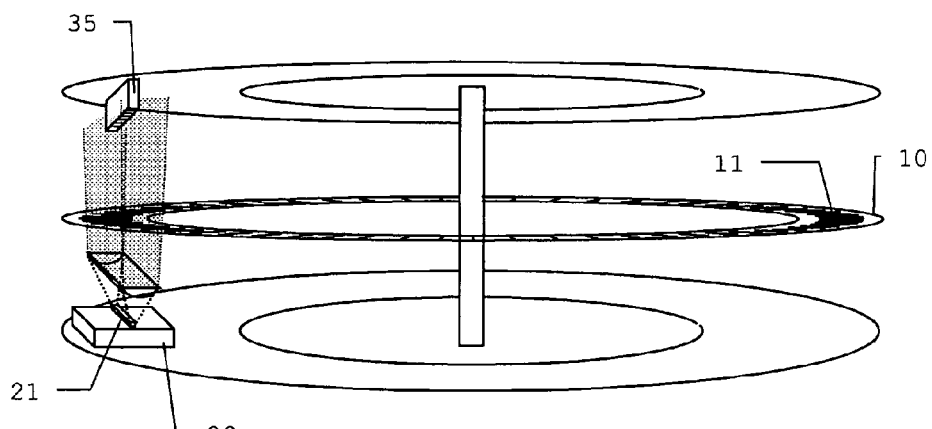
FIG. 3 shows an angle measurement device of the prior art with parallel arrangement of laser emitter edge and sensor array.

FIG. 3 shows an attitude measurement device for angle determination of the prior art, a laser diode 20 being used as a radiation source. Laser diode 20 is arranged so that the emitter edge 21 is oriented parallel to the sensor array 35. This means that the divergence axis running along the emitter edge 21—namely the slow axis—of the laser diode emission is oriented substantially parallel to the longitudinal direction of the line sensor 35 in the case of the projection produced thereby on the line sensor 35. Since the emitted radiation in the direction of the emission edge—or in the direction of the slow axis—has, however, a smaller divergence than in the transverse direction—namely the fast axis—and hence a linear radiation source tends to be present, the projection produced on the sensor array 35 has relatively little contrast and is blurred. Furthermore, emission of the laser diode 20 in the direction of the slow axis has a relatively inhomogeneous radiation characteristic, with the result that undesired intensity variations of the projection produced on the sensor array 35, which are not due to the position code, may form.

Figure 4:
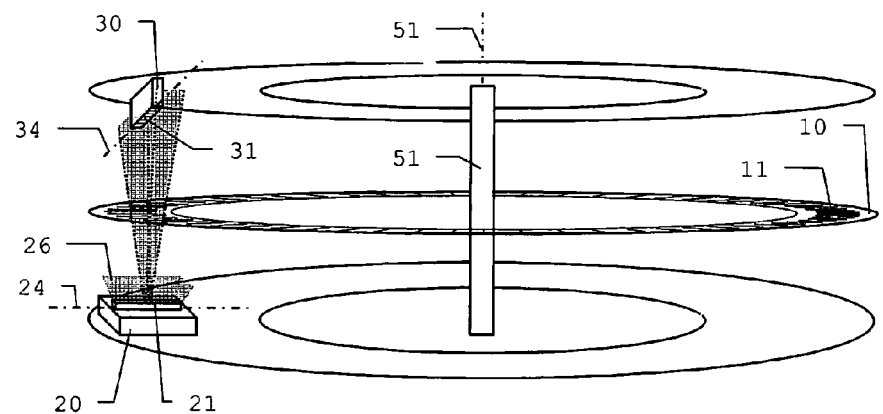
FIG. 4 shows a first embodiment of an angle measurement device according to the invention, with arrangement of the laser emitter edge transversely to the sensor array.

FIG. 4 shows an optoelectronic angle measurement apparatus according to the invention for determining a rotational position of a code carrier 10 which carries a position code 11, in a 3D view. The code carrier 10 is, as is known from the prior art and shown, for example, in FIG. 1, in the form of a ring and rotatable about the axis 51, which permits a rotational movement relative to one in a fixed position, as detection element 30. The position code 11 is arranged on the code carrier 10 along a circumference relative to the axis 51.

The detection element 30 has, in the longitudinal direction, at least one line with a multiplicity of linearly arranged photosensitive receiving regions (31) and is formed for receiving optical radiation. For example, a multiplicity of CMOS sensors arranged in a line is arranged as photosensitive receiving regions 31. The longitudinal axis 34 of the detection element is oriented transversely to a direction radial to the axis 51. A laser diode 20 as a radiation source with an emitter edge 21, the longitudinal axis 24 of which is oriented according to the invention in a direction radial to the axis 51 and hence transversely to the axis of arrangement of the sensor array 35, emits optical radiation.

By arranging the laser diode 20, according to the invention, transversely to the detection element 30, more homogeneous illumination of the code 11 is achievable since the radiation angle transverse to the emitter edge 21 is larger.

In this arrangement, too, the radiation characteristic of the laser diode 20 which has a relatively inhomogeneous variation in the direction of the emission edge 21 has a less adverse effect on the readability of the code from the projection than in the case of a parallel arrangement of laser diode 20 and sensor line. In the arrangement according to the invention, substantially a part of the laser diode emission 26 which overlaps in a plane perpendicular to the emitter edge 21 is used for producing the code projection and hence projects the radiation emitted in an axis perpendicular to the emitter edge 21 onto the sensor line—parallel to the longitudinal axis 34 thereof.

Furthermore, by arranging the laser diode 20, according to the invention, with transverse orientation relative to the sensor line of the detection element 30, the laser diode 20 serving as the radiation source can be considered approximately as a point light source, with the result that a higher contrast can be achieved in the code image.

Although, according to the invention—compared with the parallel arrangement of laser diode 20 and sensor array—a smaller part of the emitted radiation is used for producing the code projection, a considerably higher contrast can be achieved in the code image and—owing to the comparatively homogeneous radiation characteristic in an axis transverse to the emission edge 21—a very homogeneous illumination of the position code 11. Consequently, increased accuracies of measurement—compared with the accuracies achieved in the case of angle measurement devices of the prior art—can now be permitted.

The CMOS sensors of the sensor line detect the image produced by the code carrier 10, an electrical signal with radiation reception information being generated for each individual sensor. On the basis of this radiation reception information of the individual sensors, the imaged part of the position code 11 can be decrypted and an angular position can be derived therefrom as a rotational position of the code carrier 10 relative to the detection element 30.

The increase in contrast achieved according to the invention and homogenization of the undesired intensity variations of the radiation incident on the detection element 30 permits a shortening of the exposure time and an improvement in the readability of the code.

By means of the method according to the invention, for example, a rotational movement of an element whose angular position is to be determined can be transmitted to the code carrier 10 and the angular position of this element can be derived thereby. The element may be, for example, an element of a geodetic surveying station.

Figure 5:
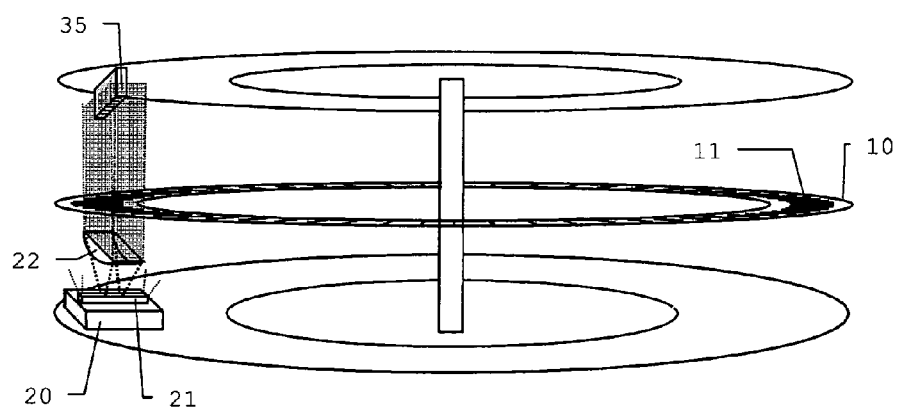
FIG. 5 shows a second embodiment of an angle measurement device according to the invention, comprising a beam reshaping optical system downstream of the laser diode.

FIG. 5 shows a further embodiment of an optoelectronic angle measurement device according to the invention for determining a rotational position of a code carrier 10. In contrast to FIG. 4, the laser diode 20 is now arranged downstream of a beam-shaping optical system 22 which collimates the emitted radiation in an axis transverse to the orientation of the emission edge 21. Here, a sensor array 35 is provided as a detection element.

Figure 6:
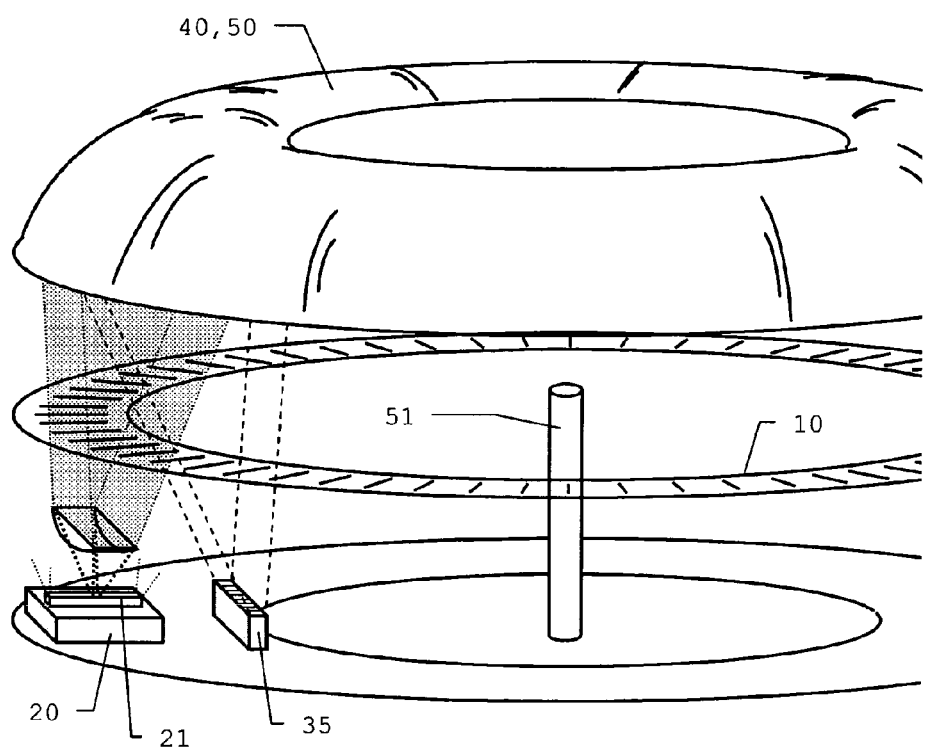
FIG. 6 shows a third embodiment of an angle measurement device according to the invention, comprising a deflection element.

In the embodiment in FIG. 6, laser diode 20 and sensor array 35 are arranged on a common circuit board, according to the invention the emitter edge 21 being oriented perpendicularly to the axis of arrangement of the sensor array 35.

The relatively slightly divergent radiation emitted in the divergence axis parallel to the emission edge 21—the slow axis—is focused by a curved and focusing deflection element 50 onto the sensor array 35. By means of the code carrier 10, a projection of an attitude-dependent part of the position code 11, which is detectable by the sensor array 30, is now produced. The deflection element 50, which is also in the form of focusing element 40, has a curved, reflective surface for this purpose. By means of the reflection surface, the radiation is focused in a defined manner in an axis transverse to the longitudinal axis of the sensor array 35. This increases the intensity of the radiation incident on the sensor array 35 and produces the image.

The deflection element 50 can be rotatably moveable together with the code carrier 10 relative to the circuit board on which the radiation source and sensor array 30 are mounted, and can deflect the radiation in any angular position, focusing it onto the sensor array 35.

Figure 7:
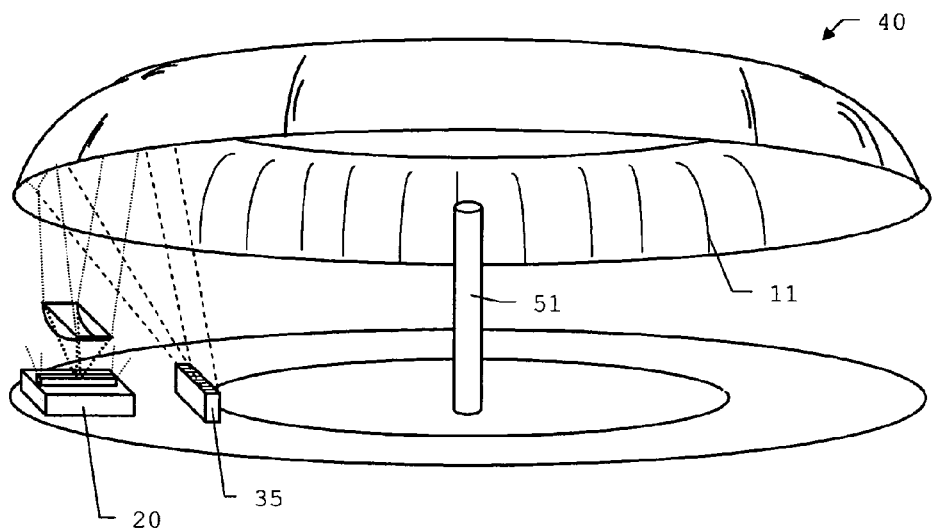
FIG. 7 shows a fourth embodiment of an angle measurement device according to the invention, comprising a deflection element which also serves as a code carrier and focuses the code projection onto the sensor array.

FIG. 7 shows an attitude measurement device according to the invention, comprising a focusing element 40 in the form of a code carrier. The focusing element 40 is formed similarly to the focusing deflection element shown in FIG. 6, but is shown from a different perspective. The focusing element 40 shown here and additionally in the form of a code carrier has, on the reflective surface facing downwards, a position code 11 in the form of a hologram along a circumference relative to the axis 51, about which the focusing element 40 is rotatable. If the laser diode 20 now emits optical radiation to a part of the focusing element 40, dependent on the rotational position, an image of a corresponding part of the position code 11, which is optically detectable by the detection element, is additionally produced when the radiation is focused in reflection onto the detection element.

Figure 8:
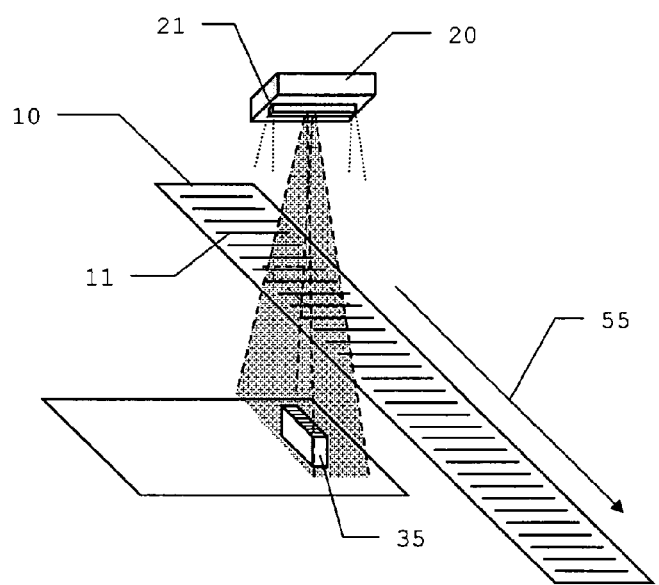
FIG. 8 shows a first embodiment of a length measurement device according to the invention, with arrangement of the laser emitter edge transversely to the sensor array.

FIG. 8 shows an attitude measurement device according to the invention for determining a length along an axis 55. For this purpose, the code carrier 10 is in the form of an elongated, thin cuboid and is moveable in the direction of its longitudinal axis 55. The position code 11 extends in the direction of the longitudinal axis 55. A radiation source in the form of laser diode 20 emits optical radiation to the sensor array 20, a projection of an attitude-dependent part of the position code 11 being produced on the sensor array 35 by the code carrier 10 arranged in between.

According to the invention—in contrast to the prior art—an arrangement of the laser diode relative to the sensor array in which the longitudinal axis of the emitter edge 21 is oriented substantially perpendicularly to the longitudinal axis of the sensor array 30 is advantageous. The advantages obtained thereby have already been described above.

The length measurement device shown in FIG. 8 can be used, for example, to coordinate measuring machines comprising a scanning arm for scanning a sample, the scanning arm being moveable independently of one another in three directions perpendicular to one another. The distance covered by the scanning arm during scanning can be determined according to the invention with improved accuracy and hence a surface structure of the sample can be more accurately derived.

Figure 9:
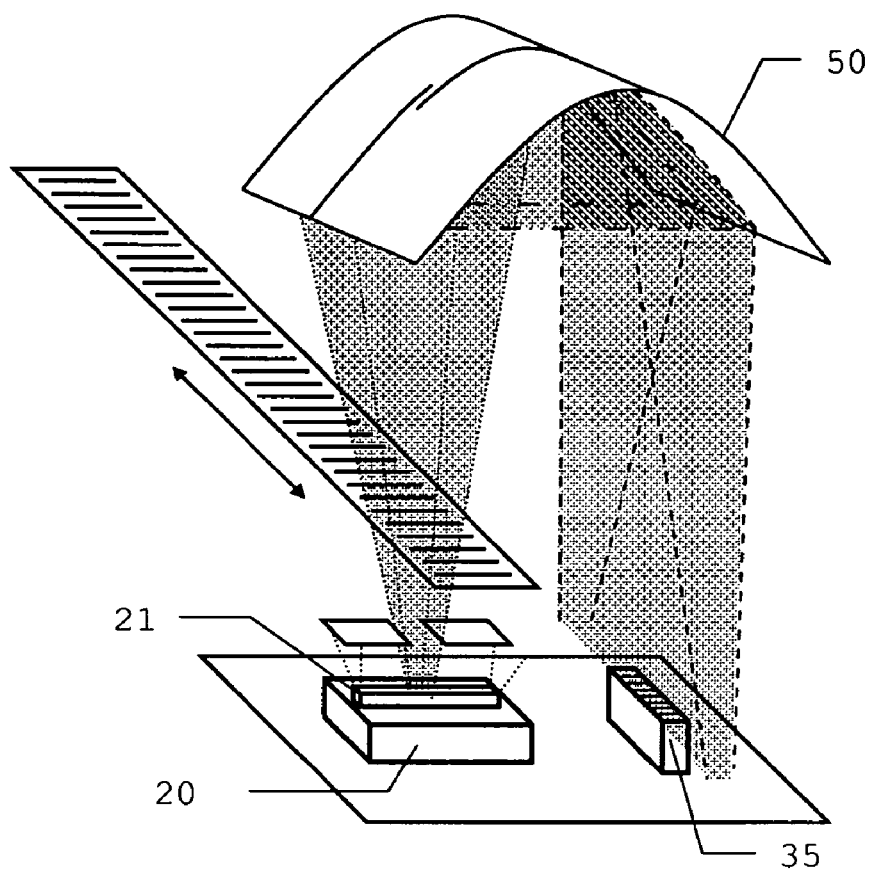
FIG. 9 shows a second embodiment of a length measurement device according to the invention.

FIG. 9 shows an alternative embodiment of the length measurement apparatus from FIG. 8. The laser diode and the sensor array 35 are mounted on a common circuit board, the code projection being projected by a focusing deflection means 50 onto the sensor array 35. Furthermore, obscuration plates are arranged after the laser diode 35, so that the illumination of the code carrier in the arrangement according to the invention is the same as a manner of illumination which is produced by an ideal point radiation source.

Of course, these figures shown represent only examples of possible embodiments.

We claim:

1. An optoelectronic attitude measurement method for determining an attitude of a code carrier which carries a position code and is moveable relative to a detection element with one degree of freedom, the detection element having, in the longitudinal direction, at least one line having a multiplicity of linearly arranged photosensitive reception regions, the method comprising:
producing a projection of a part of the position code, depending on the attitude of the code carrier, on the detection element, the production including:
emission of optical radiation to the code carrier by means of a laser diode having an emitter edge; and
detection of the projection by the detection element; and
deriving the attitude of the code carrier relative to the detection element from the projection, wherein the divergence axis of the laser diode emission which is perpendicular to the emitter edge is oriented substantially parallel to the longitudinal axis of the detection element in the case of the projection produced thereby on the detection element.

2. An optoelectronic attitude measurement method according to claim 1, wherein the detection element includes a sensor array.

3. An optoelectronic attitude measurement method according to claim 1, wherein the attitude includes an angle or a length of the code carrier which carries the position code and is moveable rotationally or translationally relative to a detection element with one degree of freedom.

4. An optoelectronic attitude measurement method according to claim 1, wherein a part of the laser diode emission which overlaps in a plane perpendicular to the emitter edge is used for producing the projection of the position code.

5. An optoelectronic attitude measurement method according to claim 1, wherein the code carrier is rotationally moveable about an axis rigidly coordinated with the detection element and at least one angle of the code carrier about the axis is derived as an attitude.

6. An optoelectronic attitude measurement method according to claim 1, wherein targeted focusing of at least a part of the optical radiation onto the reception regions is carried out during production of the projection.

7. An optoelectronic attitude measurement method according to claim 1, wherein targeted focusing of at least a part of the optical radiation onto the reception regions is carried out during production of the projection in reflection or by refraction.

8. An optoelectronic attitude measurement method according to claim 1, wherein targeted focusing of at least a part of the optical radiation onto the reception regions is carried out during production of the projection in reflection or by refraction, the focusing being effected in a plane oriented perpendicularly to the longitudinal axis of the detection element.

9. An optoelectronic attitude measurement method according to claim 1, wherein, during production of the projection, the radiation is deflected by a deflection means onto the detection element.

10. An optoelectronic attitude measurement method according to claim 1, wherein, during production of the projection, the radiation is reflected by a deflection means onto the detection element.

11. An optoelectronic attitude measurement device, comprising
a code carrier which carries an optically detectable position code;
a laser diode having an emitter edge for emission of optical radiation to the code carrier; and
a detection element which has, in the longitudinal direction, at least one line having a multiplicity of linearly arranged photosensitive reception regions for receiving at least a part of the optical radiation, with the result that a scanning signal dependent on the position code can be produced and, as a result, an attitude of the code carrier relative to the detection element can be detected, the laser diode and the detection element being arranged in a fixed spatial relationship and the code carrier being moveable relative to the detection element with one degree of freedom, wherein the laser diode and the detection element are arranged and oriented in such a way that the divergence axis of the laser diode emission, which is perpendicular to the emitter edge, is oriented substantially parallel to the longitudinal axis of the detection element during the projection produced thereby on the detection element.

12. An optoelectronic attitude measurement device according to claim 11, wherein the code carrier is moveable rotationally or translationally relative to the detection element with one degree of freedom.

13. An optoelectronic attitude measurement device according to claim 11, wherein the longitudinal axis of the emitter edge is oriented substantially perpendicularly to the longitudinal axis of the detection element.

14. An optoelectronic attitude measurement device according to claim 11, wherein the detection element is in the form of sensor array.

15. An optoelectronic attitude measurement device according to claim 11, wherein a beam-shaping optical system for shaping at least a part of the emitted radiation in an axis transverse to the emitter edge is arranged after the laser diode.

16. An optoelectronic attitude measurement device according to claim 11, wherein a beam-shaping optical system for collimating at least a part of the emitted radiation in an axis transverse to the emitter edge is arranged after the laser diode.

17. An optoelectronic laser measurement device according to claim 11, further comprising a focusing element arranged in the beam path before or after the code carrier or formed as code carrier and intended for focusing at least a part of the optical radiation onto the reception regions.

18. An optoelectronic attitude measurement device according to claim 11, wherein:
the laser diode and the detection element are arranged on a common plane; and
a deflection element for deflecting the radiation is arranged in the beam path.

19. An optoelectronic attitude measurement device according to claim 18, wherein the deflection element is in the form of a focusing element.

20. An optoelectronic attitude measurement device according to claim 11, wherein:
the code carrier is cuboid or bar-shaped and is moveable in the direction of its longitudinal axis;
the position code being arranged at least partly along an axis parallel to the longitudinal axis; and
a length along the longitudinal axis can be derived as an attitude.

21. An optoelectronic position measurement device according to claim 11, wherein:
the code carrier is annular or disc-shaped, surrounds an axis which can be rigidly coordinated with the detection element, and is rotationally moveable about the axis;
the position code being arranged at least along a partial circumference relative to the axis; and
an angle of the code carrier about the axis can be derived as an attitude.

* * * * *

UNITED STATES PATENT AND TRADEMARK OFFICE
CERTIFICATE OF CORRECTION

| | | |
|---|---|---|
| PATENT NO. | : 8,085,394 B2 | Page 1 of 1 |
| APPLICATION NO. | : 12/600512 | |
| DATED | : December 27, 2011 | |
| INVENTOR(S) | : Urs Vokinger | |

It is certified that error appears in the above-identified patent and that said Letters Patent is hereby corrected as shown below:

On the Title Page:
Item (73) Assignee: delete "Heerburg" and insert -- Heerbrugg --, therefor.

Signed and Sealed this
Seventeenth Day of April, 2012

David J. Kappos
*Director of the United States Patent and Trademark Office*